(12) United States Patent
Zerbe

(10) Patent No.: US 6,612,612 B2
(45) Date of Patent: Sep. 2, 2003

(54) PROTECTIVE DEVICE FOR A MOTOR VEHICLE

(75) Inventor: Manfred Zerbe, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 10/304,066

(22) Filed: Nov. 26, 2002

(65) Prior Publication Data

US 2003/0090094 A1 May 15, 2003

Related U.S. Application Data

(63) Continuation of application No. PCT/DE01/01994, filed on May 21, 2001.

(30) Foreign Application Priority Data

May 26, 2000 (DE) .......................................... 200 09 891

(51) Int. Cl.⁷ ................................................ B60R 21/22
(52) U.S. Cl. .................................. 280/730.2; 280/743.2
(58) Field of Search ............................... 280/730.2, 729, 280/743.2

(56) References Cited

U.S. PATENT DOCUMENTS

| | | | | |
|---|---|---|---|---|
| 5,566,977 A | * | 10/1996 | Wipasuramonton | 280/743.1 |
| 6,042,141 A | * | 3/2000 | Welch et al. | 280/729 |
| 6,168,191 B1 | * | 1/2001 | Webber et al. | 280/730.2 |
| 6,199,898 B1 | * | 3/2001 | Masuda et al. | 280/730.2 |
| 6,299,965 B1 | * | 10/2001 | Keshavaraj | 428/125 |
| 6,318,753 B1 | * | 11/2001 | Valkenburg | 280/730.2 |
| 6,409,211 B1 | * | 6/2002 | Sheng et al. | 280/730.2 |
| 6,450,527 B2 | * | 9/2002 | Kobayashi et al. | 280/729 |

FOREIGN PATENT DOCUMENTS

| | | |
|---|---|---|
| DE | 198 16 061 A1 | 10/1998 |
| DE | 298 14 990 U1 | 12/1998 |
| DE | 198 22 227 | 11/1999 |
| DE | 199 39 339 A1 | 2/2000 |
| EP | 0 960 788 A1 | 12/1999 |
| EP | 0 967 126 A1 | 12/1999 |
| JP | 11048903 | 2/1999 |
| WO | WO 06/26087 A1 | 8/1996 |

* cited by examiner

*Primary Examiner*—Paul N. Dickson
*Assistant Examiner*—Ruth Ilan
(74) *Attorney, Agent, or Firm*—Foley & Lardner

(57) ABSTRACT

A protective device for a motor vehicle comprising an airbag with an inflatable section for protecting an occupant in the passenger compartment. The inflatable section of the airbag is formed by two woven fabric plies that are joined to one another along a peripheral edge. The airbag forms a curtain next to a window pane so that one woven fabric ply faces the window pane and the other woven fabric ply faces the passenger compartment. The woven fabric plies are additionally joined to one another at points inside of the edge. The protective device also includes a gas generator for inflating the airbag by introducing a gas stream into the inflatable section. The points on which the woven fabric plies are additionally joined to one another, are arranged and configured so that a portion of the introduced gas stream is guided in a helical pattern.

13 Claims, 5 Drawing Sheets

PROTECTIVE DEVICE FOR A MOTOR VEHICLE

CROSS-REFERENCE TO RELATED APPLICATIONS

This is a continuation of International Application PCT/DE01/01994, which has an international filing date of May 21, 2001; this International Application was not published in English, but was published in German as WO 01/89884.

BACKGROUND

The invention relates to a protective device for a motor vehicle. Such a protective device may include an airbag, at least one section of which can be inflated in order to protect a vehicle occupant located in the interior of a motor vehicle, the inflatable section of the airbag being formed by two layers of woven fabric which are connected to one another along a peripheral edge, the airbag being configured so as to form a curtain next to at least one window pane of the motor vehicle so that the one layer of woven fabric faces the window pane and the other layer of woven fabric faces the interior of the vehicle, and the two layers of woven fabric being additionally connected to one another outside the peripheral edge. In addition, the protective device comprises at least one gas generator for inflating the airbag by introducing a flow of gas into the at least one inflatable section. This protective device is used especially to protect the head of a vehicle occupant, for example in the event of a side impact or in the event of a rollover.

DE 198 16 061 A1 discloses an airbag arrangement for a motor vehicle, which comprises an airbag which is configured so as to be inflated and form a curtain in the event of an accident occurring. The airbag is composed of two layers of woven fabric which are connected to one another, one of which facing, in the inflated state, the side of the vehicle bodywork and the other facing the interior of the vehicle.

In order to form an airbag, the two layers of woven fabric are not only connected to one another at the edge but also at additional connecting points so that elongated, vertically extending chambers are formed along which the gas from the gas generator flows into the airbag.

A further airbag arrangement which is configured so as to form a curtain next to a vehicle occupant and has vertically extending chambers is known from WO 96/26687 (incorporated by reference herein).

SUMMARY OF THE INVENTION

The invention is based in part on the object of providing a protective device for a motor vehicle of the type mentioned above, while having a simple design, and is defined by reliable protection of the vehicle occupants, which is to be ensured in particular by suitably introducing the gas into the airbag.

According to an embodiment of the invention, the airbag includes two layers of woven fabric connected around a peripheral edge and at additional connection points. The additional connecting points at which the two layers of woven fabric of the airbag are connected to one another are arranged and embodied in such a way that at least a part of the flow of gas which is introduced in order to inflate the airbag can be directed along the peripheral edge at which the two layers of woven fabric are connected to one another to form an airbag.

By virtue of the fact that the gases flowing into the section of the airbag which is to be inflated are directed along the peripheral edge of the section, this airbag section is firstly filled with gas along its outer circumference and thus made rigid. As a result, the section of the airbag which is to be inflated is made rigid at an early point so that the protection of the vehicle occupant also starts at a correspondingly early point.

The flow of gas is advantageously directed along an annular path which is limited on the outside by the peripheral edge of the corresponding section of the airbag and on the inside by the additional connecting points between the two layers of woven fabric of the section.

Here, the additional connecting points can form, on the one hand, a continuous, linear internal limitation for the flow of gas. On the other hand, it is possible to provide that the additional connecting points form an internal limitation which comprises a plurality of sections which are spaced apart from one another and at which the two layers of woven fabric are each connected to one another.

According to one embodiment of the invention, the flow of gas is directed at least partially along an essentially closed, annular path. According to another embodiment, the annular path is embodied in an essentially helical shape.

The two layers of woven fabric can be connected to one another along the peripheral edge of the airbag section in one piece and/or using attachment means, for example using seams. If the two layers of woven fabric which form the envelope of the airbag are formed by an additional woven fabric blank, the two layers of woven fabric are connected to one another in the region of a turn-over edge in one piece and in the region of the other edge using seams or the like.

The additional connecting points between the two layers of woven fabric which are intended to guide the flow of gas along the outer edge of the airbag can be formed, for example, by means of seams or by means of straps.

In one preferred development of the invention, the airbag has a plurality of inflatable sections which are spaced apart from one another and which can each be configured in a way according to the invention. The individual sections may be assigned, for example, to a front side window, the B pillar of the motor vehicle and a rear side window.

In order to permit a lateral curtain to be formed when the airbag or at least a section of the airbag is inflated, the airbag is preferably attached along the roof-side edge of the door frame of the vehicle. The flow of gas is then preferably introduced from the roof side into the airbag or the inflatable section or sections of the airbag.

In order to ensure that a sufficiently large part of the flow of gas which is introduced into the airbag or the corresponding section of the airbag is directed along the peripheral outer edge, the additional connecting points are embodied and arranged in such a way that a linear vertical flow of gas is possible from the roof-end edge region of the corresponding airbag section to the opposite, bottom-end edge region of the airbag section only in a small partial region of the airbag section. The intention is to prevent the gas easily flowing vertically through the airbag section.

The partial region of the airbag section in which a continuous vertical flow of gas is possible preferably covers less than half of the base area of the airbag section which is defined by the peripheral edge region.

It is to be understood that both the foregoing general description and the following detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
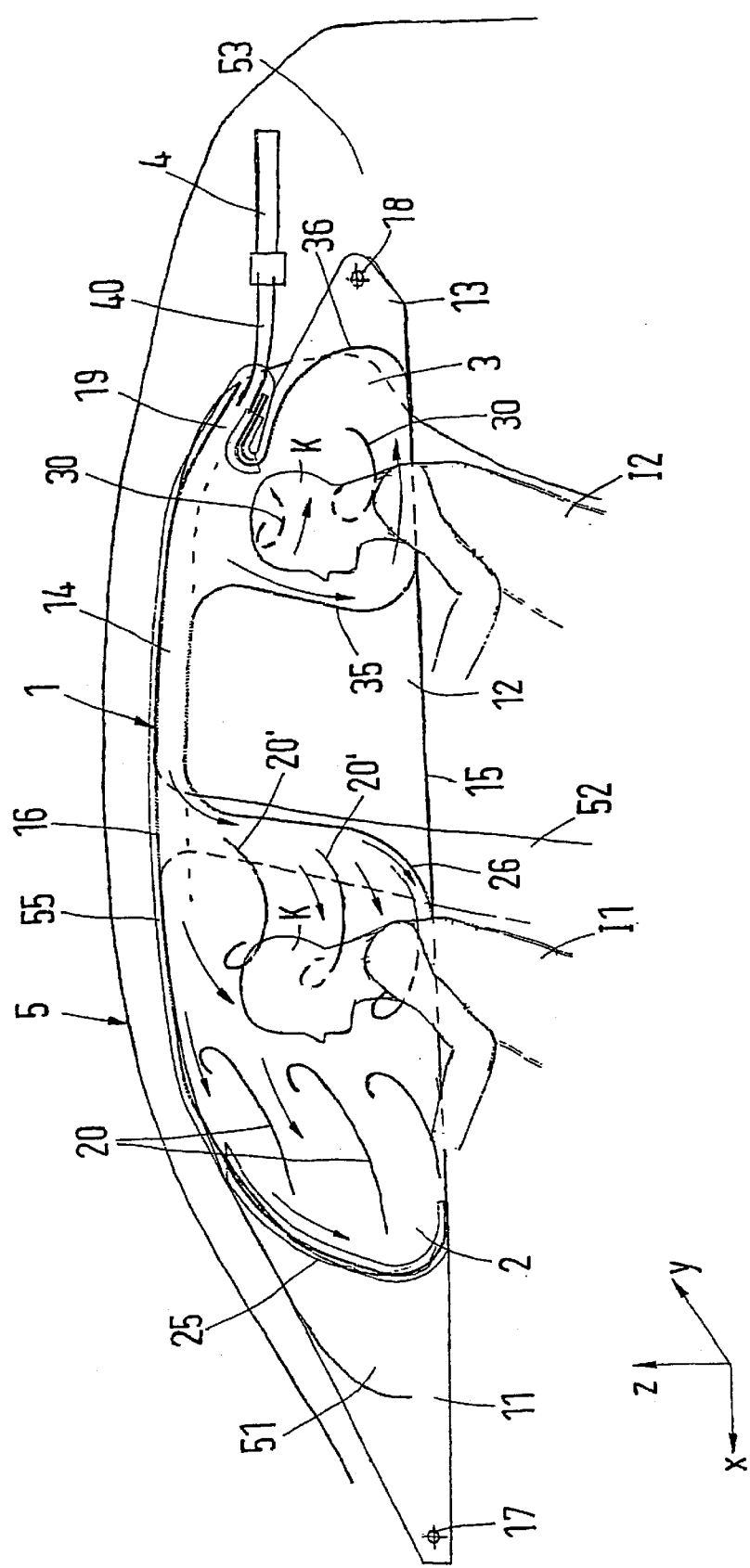
FIG. 1 is a side view of the bodywork of a motor vehicle in the region of the window panes with a schematic view of an airbag which is used to protect the head and shoulder region of the vehicle occupants located in the vehicle.

FIG. 1 shows a view of the side of the bodywork 5 of a motor vehicle in the region of the side window panes. In particular, the A pillar 51, the B pillar 52, the C pillar 53 and the roof-side section 55 of the door frame in the region of the front and rear side doors are illustrated. An airbag 1, which has two inflatable sections 2, 3 which are spaced apart from one another in the longitudinal direction (x) of the vehicle and which are in the inflated state in FIG. 1, is attached to the roof-side section 55 of the door frame.

In the inflated state, the airbag 1 forms a curtain which extends from the A pillar 51 as far as the C pillar 53 of the vehicle bodywork so that in particular the front and rear side windows and the B pillar 52 are covered by the airbag 1. Here, the front inflatable section 2 of the airbag 1 covers the front side window and the B pillar 52, and the rear inflatable section 3 of the airbag 1 which is spaced apart from it covers parts of the rear side window. The two inflatable sections 2, 3 of the airbag 1 are used principally to protect the head region K and the shoulder region of a front vehicle occupant I1 whose head is located next to the front side window, and of a rear vehicle occupant I2 whose head is located next to the rear side window.

In order to inflate the airbag 1, a gas generator 4 which is arranged in the region of the C pillar 53 is provided, having an inflatable tube 40 to which an inflation mouthpiece 19 is assigned in the upper region of the airbag 1, i.e. directly underneath the roof-side section 55 of the door frame.

The airbag 1 itself is composed of a single-part woven fabric blank which has been turned over in order to form an airbag envelope along a turn-over edge which forms the lower edge 15 of the airbag 1 so that two layers of woven fabric lying one next to the other are formed, said layers of woven fabric being connected to one another in one piece in the region of the turn-over edge 15. The two layers of woven fabric which form the envelope of the airbag 1 are sewn to one another along an upper seam 15, a front side seam 25 and a rear side seam 36, in such a way that a peripheral outer edge 15, 16, 25, 36 of the airbag 1, which is composed of the turn-over edge 15 and the aforesaid seams 16, 25, 36, is formed.

Two further seams 26, 35, running essentially perpendicular to the turn-over edge 15, divide the airbag 1 into two inflatable sections 2, 3 which each have a peripheral edge 15, 26, 16, 25 and 15, 36, 16, 35, respectively, and which are connected to one another via a duct 14. These two inflatable sections 2, 3 are used, as already explained above, to protect the head region K and the shoulder region of a front vehicle occupant I1 or of a rear vehicle occupant I2.

A noninflatable woven fabric region 12 runs between the two airbag sections 2, 3. A front woven fabric region 11, which is used to attach the airbag 1 to the vehicle bodywork in the region of the A pillar 51, extends in front of the front inflatable section 2. For this purpose, this woven fabric region 11 is provided with a corresponding attachment point 17. The rear inflatable section 3 of the airbag 1 is adjoined by a rear woven fabric region 13 which is used to attach the airbag 1 to the vehicle bodywork in the region of the C pillar 53, for which purpose a corresponding attachment point 18 is also provided along this woven fabric region 13.

Tucks 20, 20' and 30, which run essentially in the longitudinal direction x of the vehicle, extend both in the front inflatable section 2 of the airbag 1 and in the rear inflatable section 3. Along these tucks 20, the two layers of woven fabric of the airbag 1, one of which faces the vehicle bodywork and the other the interior of the vehicle or the vehicle occupant, are connected to one another.

The formation and arrangement of the tucks 20, 20' in the front section 2, and of the tucks 30 in the rear section 3 of the airbag 1, is such that the flow of gas (symbolized by arrows in FIG. 1), which enters the respective airbag section 2, 3 from the roof side, can flow along the outer edge 16, 25, 15, 26 and 16, 35, 15, 36, respectively, of the respective section 2, 3 of the airbag 1. The tucks 20, 20' and 30 which run essentially in the longitudinal direction x of the vehicle form here an internal limitation of the flow of gas. By reference to the front inflatable section 2 it becomes clear here that the flow of gas does not necessarily need to flow continuously in one direction (in the clockwise or counter-clockwise direction) along the outer edge 16, 25, 15, 26 of the section 2. Instead, it is also possible for two flows of gas to flow toward one another along the outer edge.

In addition, it becomes clear that the entire flow of gas is not directed along the outer edge. Instead, a part of the flow of gas runs in the longitudinal direction of the vehicle between the tucks 20, 20' and 30.

Various refinements of the airbag 1 from FIG. 1 are illustrated in FIGS. 2 to 5. These figures are concerned essentially with the configuration of the tucks within the front and rear airbag section 2, 3. Further details will be given on these exclusively therefore below. Furthermore, the airbags illustrated in FIGS. 2 to 5 correspond to the airbag shown in FIG. 1.

Figure 2:
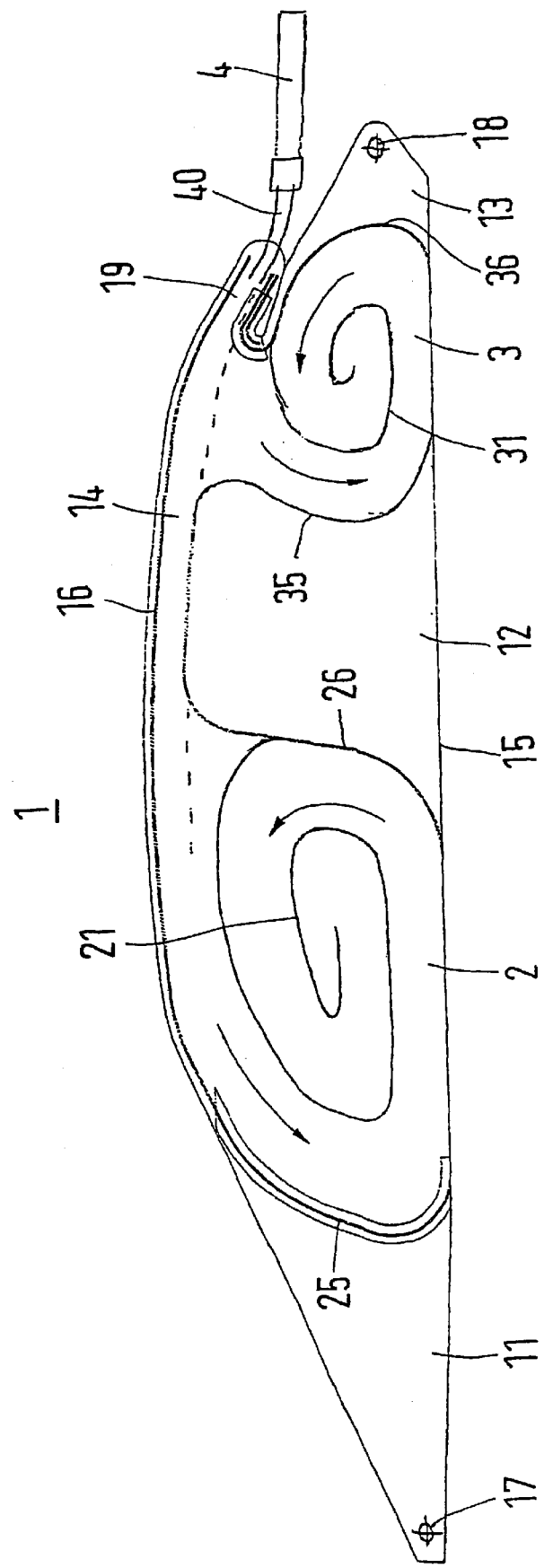
FIG. 2 shows a refinement of the airbag from FIG. 1, the airbag having two inflatable sections which are configured in such a way that when the airbag is inflated the flow of gas firstly flows along the outer edge of the respective section.

In the exemplary embodiment according to FIG. 2, the tucks 21, 31 in the front and rear sections 2, 3 of the airbag 1 each run in a spiral shape. As a result, a helical flow of gas, which runs from the outside to the inside, is generated. The two inflatable sections 2, 3 of the airbag 1 are therefore firstly inflated along their outer edge 16, 25, 15, 26 and 16, 35, 15, 36, respectively. The central region of the respective inflatable section then fills up only after this.

Figure 3:
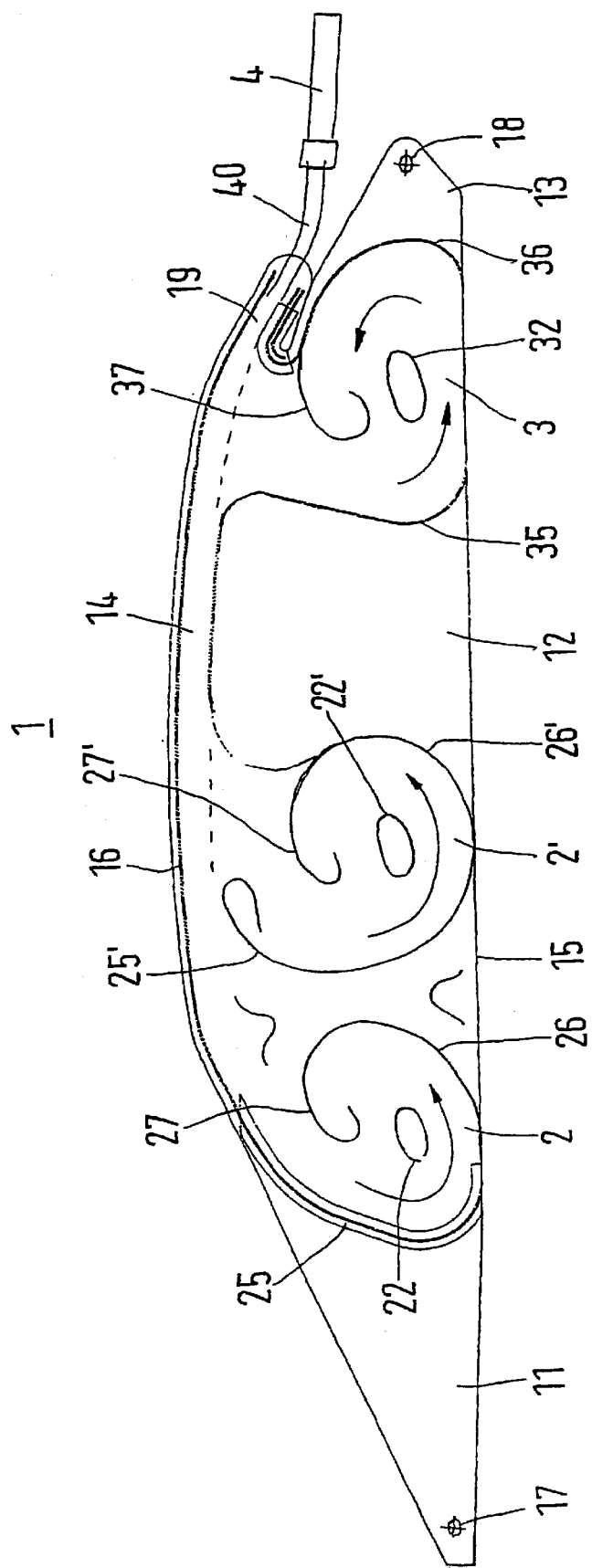
FIG. 3 shows a refinement of the airbag from FIG. 2, the airbag having three inflatable sections.

In the exemplary embodiment according to FIG. 3, two front inflatable sections 2, 2' and a rear inflatable section 3 are provided arranged one behind the other. Accordingly, two additional front lateral limiting walls (limiting seams 25' 26') are provided to form the second front airbag section 2'.

The rear lateral limiting seams 26, 26', 36 of the inflatable sections 2, 2' and 3 each have a continuation 27, 27' and 37, respectively, toward the front in the longitudinal direction of the vehicle. In addition, an annular internal tuck 22, 22' and 32, respectively, is provided in each of the inflatable sections 2, 2', 3.

This configuration of the seams or tucks permits a circumferential, closed flow of gas. Here, the respective continuation 27, 27', 37 of the rear limiting seam 26, 26', 36 of the inflatable sections 2, 2', 3 serves in each case both as an internal limitation, specifically in the flow-in region of the respective inflatable section, and as an external limitation for the flow of gas which runs in an annular shape in the respective airbag section.

Figure 4:
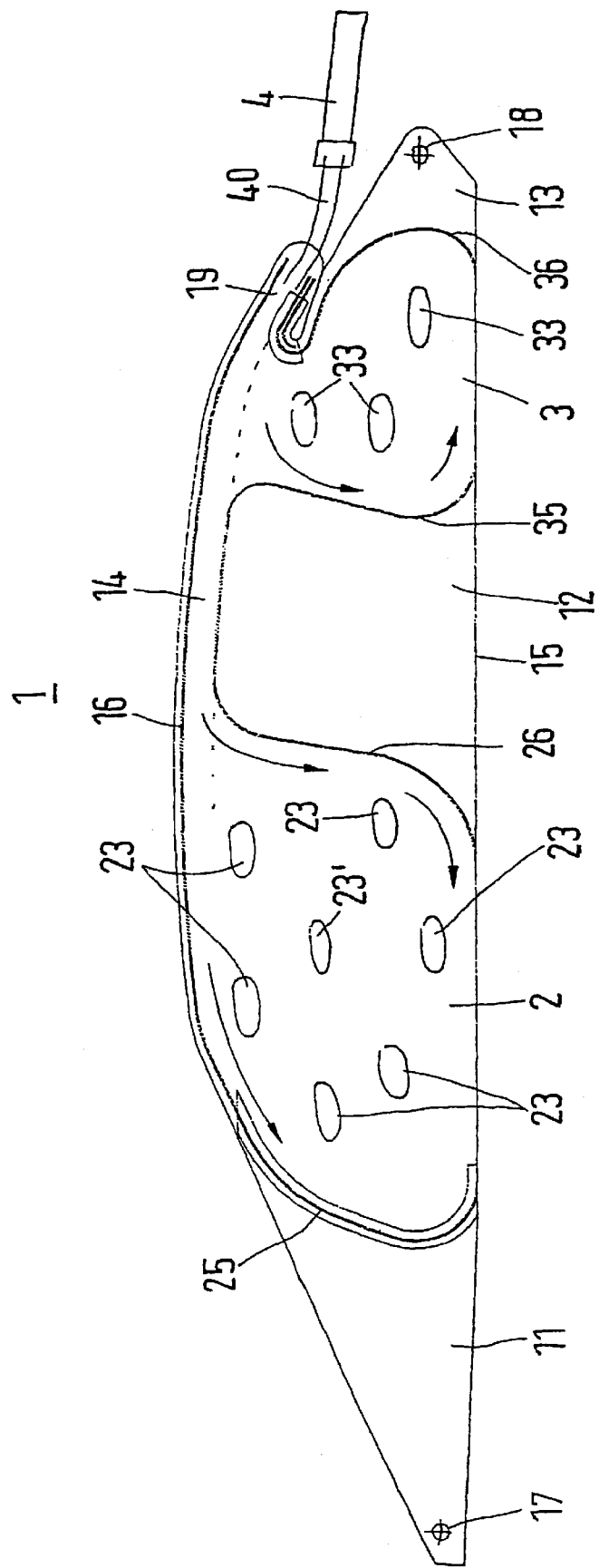
FIG. 4 shows a second refinement of the airbag from FIG. 2, discrete tucks which are each spaced apart from one another being provided in the two inflatable sections of the airbag in order to direct the introduced flow of gas along the outer edge of the respective section.

In the exemplary embodiment according to FIG. 4, in each case a plurality of tucks 23 and 33, respectively, which are spaced apart from one another are arranged in an annular shape in the inflatable sections 2, 3 of the airbag 1 in order to form an internal limitation for a flow of gas which flows along the outer edge of the respective section 2, 3. A central tuck 23' is also additionally provided here in the front section 2, said central tuck 23' preventing the formation of a continuous vertical flow of gas in the central region of the front section 2 of the airbag 1.

Figure 5:
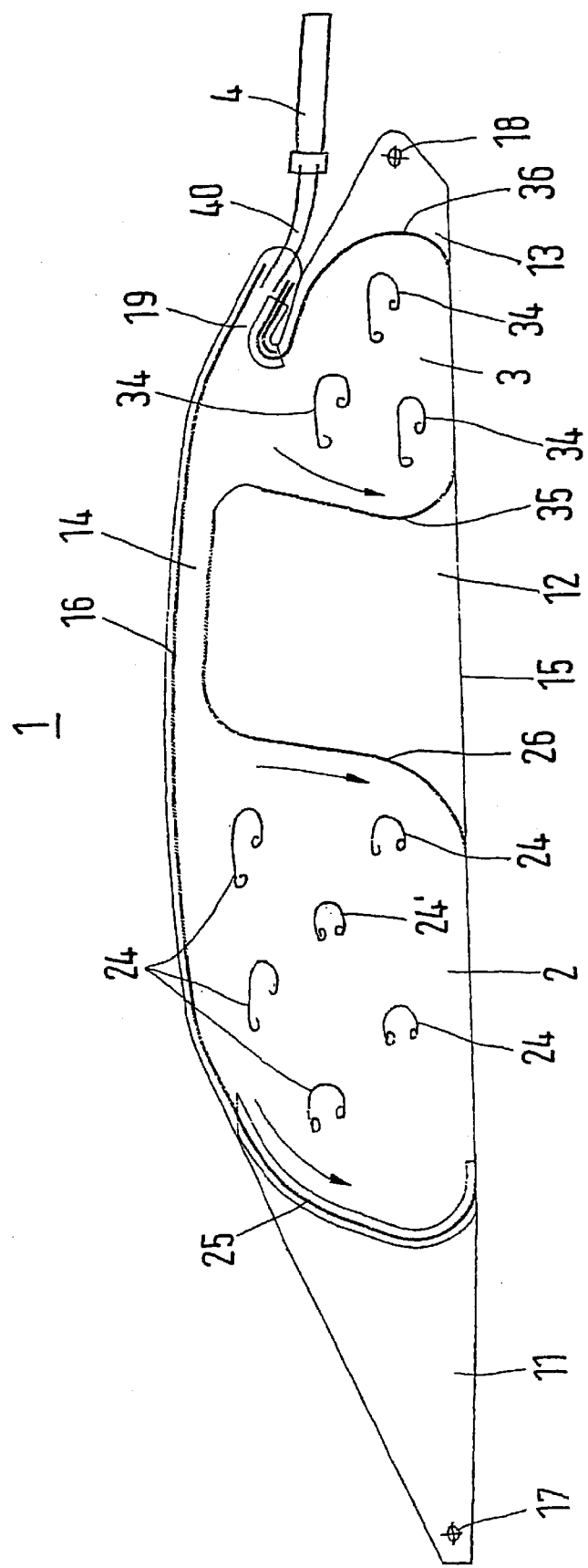
FIG. 5 shows a variant of the airbag from FIG. 4, the tucks being embodied in an essentially U shape.

In the exemplary embodiment according to FIG. 5, tucks 24, 24', 34 are arranged in the two inflatable sections 2, 3 of the airbag 1 in a way which corresponds to that in the exemplary embodiment according to FIG. 4. A difference is however that according to FIG. 5 the tucks 24, 24', 34 are embodied essentially in a U shape, the limbs of the tucks being oriented in the longitudinal direction (x direction, cf. FIG. 1) of the vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A protective device for a motor vehicle comprising:
an airbag including an inflatable section for protecting a vehicle occupant located in the interior of a vehicle;
wherein the inflatable section of the airbag is formed by two layers of woven fabric which are connected to one another along a peripheral edge;
wherein the airbag is configured to form a curtain next to a window pane of the motor vehicle so that one layer of woven fabric faces the window pane and the other layer of woven fabric faces the interior of the vehicle, and
wherein the two layers of woven fabric are connected to one another at additional connecting points inside the inflatable section; and
a gas generator for inflating the airbag by introducing a flow of gas into the inflatable section, wherein the additional connecting points are arranged and so that at least a part of the flow of gas for inflating the airbag is directed along a spiral path.

2. The protective device as claimed in claim 1, wherein part of the flow of gas is directed along an annular path which is limited on the outside by the peripheral edge and on the inside by the additional connecting points.

3. The protective device as claimed in claim 2, wherein the additional connecting points form a linear internal limitation of the flow of gas.

4. The protective device as claimed in claim 2, wherein the additional connecting points form an internal limitation on the flow of gas, the limitation including a plurality of sections which are spaced apart from one another and at which the two layers of woven fabric are connected to one another.

5. The protective device as claimed in claim 2, wherein the part of the flow of gas is directed along a closed path.

6. The protective device as claimed in claim 1, wherein the two layers of woven fabric are connected to one another along the peripheral edge using seams.

7. The protective device as claimed in claim 1, wherein the two layers of woven fabric are connected to one another at the additional connecting points using seams.

8. The protective device as claimed in claim 1, wherein the two layers of woven fabric are connected to one another at the additional connecting points using straps.

9. The protective device as claimed in claim 1, wherein the inflatable section of the airbag includes at least two portions which are spaced apart from one another by a non-inflatable section of the airbag.

10. The protective device as claimed in claim 1, wherein the airbag is provided for attachment along a roof-side edge of a door frame of the vehicle.

11. The protective device as claimed in claim 10, wherein the flow of gas is introduced from the roof side into the inflatable section of the airbag.

12. The protective device as claimed in claim 11, wherein the additional connecting points are arranged so that a linear vertical flow of gas is possible from the roof-side edge region of the section to an opposite, bottom-side edge region of the section only in a portion of the inflatable section of the airbag.

13. The protective device as claimed in claim 12, wherein the portion of the inflatable section covers less than half of the base area of the inflatable section of the airbag.

* * * * *